United States Patent
Yang et al.

(10) Patent No.: US 9,602,198 B2
(45) Date of Patent: Mar. 21, 2017

(54) USING FRACTIONAL FOURIER TRANSFORM NONLINEAR EFFECTS IN OPTICAL FIBER LINK MONITORING METHODS

(71) Applicant: Beijing Institute of Technology, Beijing (CN)

(72) Inventors: Aiying Yang, Beijing (CN); Xiaoyu Chen, Beijing (CN)

(73) Assignee: Beijing Institute of Technology, Beijing (CN)

( * ) Notice: Subject to any disclaimer, the term of this patent is extended or adjusted under 35 U.S.C. 154(b) by 0 days.

(21) Appl. No.: 14/954,013

(22) Filed: Nov. 30, 2015

(65) Prior Publication Data

US 2017/0019172 A1 Jan. 19, 2017

(30) Foreign Application Priority Data

Jul. 15, 2015 (CN) .......................... 2015 1 0415663

(51) Int. Cl.
| | | |
|---|---|---|
| H04B 10/04 | (2006.01) |
| H04B 10/06 | (2006.01) |
| H04B 10/40 | (2013.01) |
| H04B 10/077 | (2013.01) |

(52) U.S. Cl.
CPC ................................ *H04B 10/0775* (2013.01)

(58) Field of Classification Search
None
See application file for complete search history.

(56) References Cited

U.S. PATENT DOCUMENTS

| | | | | |
|---|---|---|---|---|
| 6,252,692 B1* | 6/2001 | Roberts | .............. | H04B 10/2513 |
| | | | | 398/147 |
| 8,594,499 B1* | 11/2013 | Roberts | ................ | H04B 10/073 |
| | | | | 398/28 |
| 2002/0089733 A1* | 7/2002 | Gopalakrishnan | .... | G02F 1/2255 |
| | | | | 359/254 |

(Continued)

OTHER PUBLICATIONS

Liu Yan-ge, Liu Wei, Zhang Yi-mo, Zhou Ge, Investigation on Data Processing Methods in the Detection System of Optical Fiber, Infrared and Laser Engineering, Jun. 2001, vol. 30 No. 3, 5 pgs.

*Primary Examiner* — Oommen Jacob
(74) *Attorney, Agent, or Firm* — Faegre Baker Daniels LLP (57) ABSTRACT

The present invention proposes a method for monitoring the nonlinear effect of an optical fiber link by fractional Fourier transformation, FRFT, by calculating an optimal fractional order of the FRFT of the frequency-domain signal propagating through an optical fiber link, calculating the chromatic dispersion of an optical fiber link based on the optimal fractional order, compensating for chromatic dispersion to the signal, calculating an optimal fractional order of the FRFT for the time-domain signal following the compensation for chromatic dispersion, calculating the time-domain chirp caused by the nonlinear effect of an optical fiber link based on the optimal fractional order, and monitoring the nonlinear effect of an optical fiber link based on the absolute value of the calculated time-domain chirp. The method can be used for quantitatively monitoring the nonlinear effect of an optical fiber link in an optical fiber communication system consisting of different types of optical fibers.

4 Claims, 4 Drawing Sheets

(56) References Cited

U.S. PATENT DOCUMENTS

| | | | |
|---|---|---|---|
| 2003/0086713 A1* | 5/2003 | Inui | H04B 10/2519 398/199 |
| 2003/0137652 A1* | 7/2003 | Mori | G01M 11/338 356/73.1 |
| 2004/0220986 A1* | 11/2004 | Pisoni | G06F 17/141 708/403 |
| 2004/0254969 A1* | 12/2004 | Pisoni | H04L 27/2662 708/404 |
| 2005/0089243 A1* | 4/2005 | Ludwig | G02B 7/36 382/280 |
| 2005/0111852 A1* | 5/2005 | Mahgerefteh | G02B 5/281 398/187 |
| 2005/0244164 A1* | 11/2005 | Miyashita | H04B 10/25253 398/147 |
| 2007/0103362 A1* | 5/2007 | Arikan | G01S 13/524 342/195 |
| 2009/0297140 A1* | 12/2009 | Heismann | G01M 11/333 398/16 |
| 2010/0021179 A1* | 1/2010 | Kikuchi | H04B 10/61 398/183 |
| 2015/0180577 A1* | 6/2015 | Wang | H04B 10/27 398/58 |
| 2016/0099777 A1* | 4/2016 | Liu | H04B 10/2513 398/159 |
| 2016/0099782 A1* | 4/2016 | Kuang | H04B 10/25133 398/136 |
| 2016/0211916 A1* | 7/2016 | Yang | H04B 10/6161 |

* cited by examiner

USING FRACTIONAL FOURIER TRANSFORM NONLINEAR EFFECTS IN OPTICAL FIBER LINK MONITORING METHODS

The present application claims a priority of a Chinese patent application that was filed to the China Patent Office on Jul. 15, 2015, with the application No. 201510415663.4 and has the title "METHOD FOR MONITORING OF THE NONLINEAR EFFECT OF AN OPTICAL FIBER LINK BY FRACTIONAL FOURIER TRANSFORMATION (FRFT)", of which all contents are incorporated by reference into the present application.

FIELD OF THE INVENTION

The present invention relates to a method for monitoring the nonlinear effect of an optical fiber link by a fractional Fourier transformation (FRFT), in particular to a method for quantitative characterization of the nonlinear effect of an optical fiber link by FRFT, belonging to the technical field of high-speed optical communications.

BACKGROUND OF THE INVENTION

Two basic factors that limit the performance of optical fiber communication systems are chromatic dispersion and nonlinear effect of an optical fiber link. For instance, for a 10 Gbps optical fiber communication system, when the launched power of optical signal is 0.0 dBm, the transmission distance of a standard mono-mode optical fiber is about 60 km if the chromatic dispersion is not compensated, while the transmission distance for a 40 Gbps optical fiber communication system is only 3.5 km. In the case that the launched power is higher than 0.0 dBm, the signal distortion that the nonlinear effect produces allows for a shorter transmission distance of the optical fiber communication system. Therefore, for an optical fiber communication system or an optical fiber link, it is necessary to monitor in real-time and equalize the chromatic dispersion and the nonlinear effect of the optical fiber.

Methods of measuring the chromatic dispersion of an optical fiber mainly include a frequency spectrum analysis method, a vestigial sideband filter method, a nonlinear spectral analysis method and the like. These methods may intrude the operation of an optical fiber link, and are not transparent to the modulation formats and data rate, thus cannot satisfy the requirement of monitoring the practical optical fiber links in real time. Moreover, a measurement of the nonlinear effect of an optical fiber is still a world-famous puzzle, and no method of quantitative measurement has yet been currently proposed. As the data rate of an optical fiber communication system is increasingly higher, and the channel spacing is increasingly narrower, it becomes more and more important to estimate and equalize the chromatic dispersion and the nonlinear effect of an optical fiber. Therefore, how to perform an intrusion-free, real-time, and accurate monitoring of the chromatic dispersion and the nonlinear effect in an ultrahigh speed optical fiber optic communication link is a difficult problem urgently required to be solved in the field of optical communications.

In an optical fiber communication system or network, the traditional method for measuring the nonlinear effect in the optical fiber link mainly includes an all-optical pre-processing method, a frequency spectrum analysis method, a binarization method, a nonlinear spectral analysis method and the like (see "research on method for digital data processing in optical fiber detection", infrared and laser engineering. Vol. 30, No. 3, LIU Yange et al, June, 2001). The above traditional Fourier transformation based methods for identifying and measuring the nonlinear effect of optical signal are fast. But the resolution and accuracy are low, the Fourier transformation based methods are not suitable for an optic communication system of high speed and consisting of different types of optical fibers.

Following retrieval, none of the domestic and foreign literatures and patents report the method based on a FRFT for monitoring the nonlinear effect in an optical fiber link. And how to accurately monitor the nonlinear effect of an optical fiber link in real-time and intrusion free is a difficult problem to be urgently solved in the field of ultrahigh speed optical fiber communications.

SUMMARY OF THE INVENTION

It is an object of the invention to solve a difficult problem of interference-free, real-time and accurately monitoring the nonlinear effect in an ultrahigh speed optical fiber link, and a method for monitoring of the nonlinear effect of an optical fiber link by FRFT is proposed.

The central idea of the method for monitoring the nonlinear effect of an optical fiber link by FRFT in the present invention is, the chromatic dispersion of the optical fiber link causes optical pulse signal to become a frequency-domain chirp signal, the nonlinear effect of an optical fiber causes the optical pulse signal to become a time-domain chirp signal, based on the energy focusing effect of a chirped signal in the FRFT, first calculating an optimal fractional order of the FRFT of the frequency-domain signal, followed by calculating a chromatic dispersion of the optical fiber link based on the optimal fractional order, and compensating for chromatic dispersion to the signal, and next, calculating an optimal fractional order of the FRFT of the time-domain signal following the compensation for chromatic dispersion, and calculating a chirp coefficient of a time-domain signal following the compensation for chromatic dispersion based on the optimal fractional order, monitoring the nonlinear effect of the optical fiber link based on the absolute value of the chirp coefficient.

The object of the invention is achieved by the technical solutions as follows:

a method for monitoring the nonlinear effect of an optical fiber link by FRFT, the specific steps are as follows:

step one, performing coherent demodulation for an optical signal propagating through an optical fiber link to obtain a real part $E_I$ and an imaginary part $E_Q$ of an electric field of the optical signal, and next, calculating the complex electric field of the optical signal by $E = E_I + jE_Q$, where j is an imaginary unit;

step two, performing Fourier transformation for the complex field of the optical signal obtained in the step one to obtain the complex field in frequency domain $\tilde{E}(\omega)$, where $\omega$ is an angle frequency of the optical pulse signal;

step three, performing FRFT for the complex field in frequency domain obtained in the step two, based on the energy focusing effect of the chirp signal in the fractional spectrum, calculating an optimal fractional order $p_{optimum}$ of the FRFT; the method of searching for the optimal fractional order comprises a fractional-order spectral entropy, an optimal filtering operator, maximizing a density of zero-center normalized instantaneous amplitude spectrum, maximizing a variance of fractional-order amplitude spectrum;

step four, calculating the chromatic dispersion of the optical fiber link based on the optimal fractional order obtained in the step three;

the concrete method is based on the optimal fractional order $\rho_{optimum}$ obtained in the step three, calculating a chromatic dispersion of an optical fiber link, i.e., $$CD = -\frac{\cot\left(\frac{\pi}{2}\rho_{optimum}\right)}{2\pi S^2},$$

where S is a scale factor in the FRFT, the value thereof is S= $\sqrt{N}$, and N is the number of samples of a signal;

step five, compensating for chromatic dispersion for the complex field in frequency domain obtained in the step two based on the chromatic dispersion of the optical fiber link obtained in the step four to obtain the complex field in frequency domain $\tilde{E}_{Comp}(107)$ following the dispersion compensation;

the concrete method is that the complex field in frequency domain obtained in the step two is multiplied by a dispersion function, i.e., $\tilde{E}_{Comp}(107) = \tilde{E}(107) \times e^{-jCD \times \omega^2}$;

step six, performing an inverse Fourier transformation for the complex field in frequency domain $\tilde{E}_{Comp}(107)$, obtained in the step five to obtain a complex field in a time domain $E_{Comp}$;

step seven, performing FRFT for the complex field of a time domain $E_{Comp}$ obtained in the step six, calculating the optimal fractional order $\rho'_{optimum}$ of the FRFT; the method of searching for the optimal fractional order comprises a fractional-order spectral entropy, an optimal filtering operator, maximizing a density of zero-center normalized instantaneous amplitude spectrum, maximizing a variance of fractional-order amplitude spectrum;

step eight, calculating a chirp coefficient of the complex field in time domain $E_{Comp}$ based on the optimal fractional order $\rho'_{optimum}$ obtained in the step seven, i.e., $$C = -\frac{\cot\left(\frac{\pi}{2}\rho'_{optimum}\right)}{2\pi S^2},$$

where S is a scale factor in the FRFT, the value thereof is S= $\sqrt{N}$, and N is the number of samples of a signal; and step nine, an absolute value |C| of the chirp coefficient of the complex field in time domain $E_{Comp}$ obtained in the step eight is proportional to a nonlinear phase shift caused by the nonlinear effect of the optical fiber, and therefore the absolute value |C| of the chirp coefficient of the complex field in time domain $E_{Comp}$ can be used for monitoring the nonlinear effect of the optical fiber;

where a method that can be adopted for searching for the optimal fractional order of the FRFT in the step three and step seven includes maximizing a variance of a fractional-order amplitude spectrum, comprising:

calculating a variance of a fractional spectrum amplitude obtained by FRFT, the fractional order corresponding to the maximum value of the variance of a fractional spectrum amplitude is an optimal fractional order; to be special, a fractional order $\rho_i$ changes to $\rho_i = \rho_{i-1} + \Delta$ in a range of [0, 2] based on a fixed step length $\Delta$, performing FRFT for each fractional order, respectively, calculating a variance $\sigma_i$ of an amplitude spectrum of each FRFT, further calculating the maximum value of all of the variances of the amplitude spectrum, and the resulting fractional order corresponding to the maximum value of the variance of the amplitude spectrum is an optimal fractional order.

Advantageous Effects

The method and system for quantitatively characterizing the nonlinear effect of an optical fiber link by FRFT in the present invention have the following advantageous effects:

1. the system of monitoring the nonlinear effect of an optical fiber link designed based on the method of the present invention is simple in structure, easy to implement, and unnecessary to change a transmitter;

2. the present invention is applicable to multiple modulation formats and different transmission rates, including OOK, QPSK, QAM and the like;

3. the monitoring system for monitoring the nonlinear effect of an optical fiber link designed based on the method of the present invention is simple, and monitoring parameters can be characterized quantitatively;

4. the monitoring system for monitoring the nonlinear effect of an optical fiber link designed based on the method of the present invention can accurately monitor the nonlinear effect, and has a wide monitoring range;

5. the present invention complies with a requirement of monitoring the nonlinear effect of a high-speed optical-fiber communication link and an optical network, can be applied to an optical communication link system consisting of different types of optical fibers, in particular it is applicable to a high-speed optical-fiber communication system for accurately monitoring and equalizing the nonlinear effect;

6. the present invention is simple to be integrated, satisfies the requirement of online, interference-free and real-time monitoring of optical fiber communication links, and can conveniently and accurately monitor the optical fiber nonlinear effect.

DETAILED DESCRIPTION OF THE INVENTION

For a better description of objects and advantages of the present invention, a further description of summary of the invention is provided in conjunction with drawings and embodiments below.

Embodiments

Figure 1:
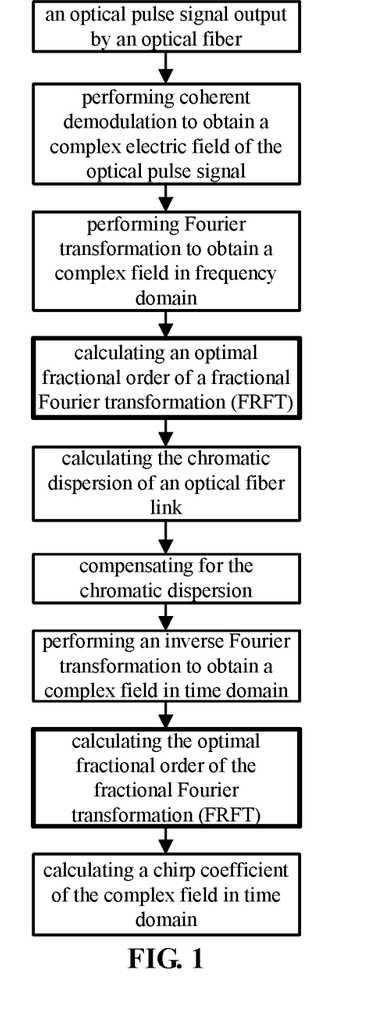
FIG. 1 is a flowchart of a method for monitoring the nonlinear effect of an optical fiber link by FRFT in the present invention and embodiments.

The present invention relates to a method for monitoring of the nonlinear effect of an optical fiber link by fractional Fourier transformation (FRFT), the procedure thereof is as shown in FIG. 1, steps while specific implementations are as follows:

step one, performing coherent demodulation for an optical pulse signal propagating through an optical fiber link to obtain a real part $E_I$ and an imaginary part $E_Q$ of an electric field of the optical signal, and next, calculating the complex electric field $E=E_I+jE_Q$, where j is an imaginary unit;

step two, performing Fourier transformation for the complex field of the optical pulse signal obtained in the step one to obtain the complex field in frequency domain $\tilde{E}(\omega)$, where $\omega$ is an angle frequency of the optical pulse signal;

step three, performing FRFT for the complex field in frequency domain obtained in the step two, based on the energy focusing effect in the fractional spectrum of the chirp signal, calculating an optimal fractional order $\rho_{optimum}$ of the FRFT; the method of searching for the optimal fractional order comprises a fractional-order spectral entropy, an optimal filtering operator, maximizing a density of zero-center normalized instantaneous amplitude spectrum, maximizing a variance of fractional-order amplitude spectrum;

step four, calculating the chromatic dispersion of the optical fiber link based on the optimal fractional order obtained in the step three;

the concrete method is: based on the optimal fractional order $\rho_{optimum}$ obtained in the step three, calculating a chromatic dispersion of an optical fiber link, i.e., $$CD = -\frac{\cot(\frac{\pi}{2}\rho_{optimum})}{2\pi S^2},$$

where S is a scale factor in the FRFT, the value thereof is $S=\sqrt{N}$, and N is the number of samples of a signal;

step five, compensating for chromatic dispersion for the complex field in frequency domain obtained in the step two based on the chromatic dispersion of the optical fiber link obtained in the step four to obtain the complex field in frequency domain $\tilde{E}_{Comp}(107)$ following the dispersion compensation;

the concrete method is that the complex field in frequency domain obtained in the step two is multiplied by a dispersion function, i.e., $\tilde{E}_{Comp}(107)=\tilde{E}(107)\times e^{-jCD\times\omega^2}$;

step six, performing an inverse Fourier transformation for the complex field in frequency domain $\tilde{E}_{Comp}(107)$ obtained in the step five to obtain a complex field in time domain $E_{Comp}$;

step seven, performing FRFT for the complex field of a time domain $E_{Comp}$ obtained in the step six, calculating the optimal fractional order $\rho_{optimum}$ of the FRFT; the method of searching for the optimal fractional order comprises a fractional-order spectral entropy, an optimal filtering operator, maximizing a density of zero-center normalized instantaneous amplitude spectrum, maximizing a variance of fractional-order amplitude spectrum;

step eight, calculating a chirp coefficient of the complex field in time domain $E_{Comp}$ based on the optimal fractional order $\rho_{optimum}$ obtained in the step seven, i.e., $$C = -\frac{\cot(\frac{\pi}{2}\rho'_{optimum})}{2\pi S^2},$$

where S is a scale factor in the FRFT, the value thereof is $S=\sqrt{N}$, and N is the number of samples of a signal;

step nine, an absolute value $|C|$ of the chirp coefficient of the complex field in time domain $E_{Comp}$ obtained in the step eight is proportional to a nonlinear phase shift caused by the nonlinear effect of the optical fiber, and therefore the absolute value $|C|$ of the chirp coefficient of the complex field in time domain $E_{Comp}$ can be used for monitoring the size of the nonlinear effect of the optical fiber;

where a method that can be adopted for searching for the optimal fractional order of the FRFT in the step three and step seven includes maximizing a variance of a fractional-order amplitude spectrum, comprising:

calculating the variance of fractional amplitude spectrum obtained by FRFT with different fractional order, the fractional order corresponding to the maximum value of the variance of an amplitude of fractional spectrum is an optimal fractional order; to be special, a fractional order $\rho_i$ changes to $\rho_i=\rho_{i-1}+\Delta$ in a range of [0, 2] based on a fixed step length $\Delta$, performing FRFT for each fractional order, respectively, calculating a variance $\sigma_i$ of an amplitude spectrum of each FRFT, further calculating the maximum value of all of the variances of the amplitude spectrum, and the resulting fractional order corresponding to the maximum value of the variance of the amplitude spectrum is an optimal fractional order.

Figure 2:
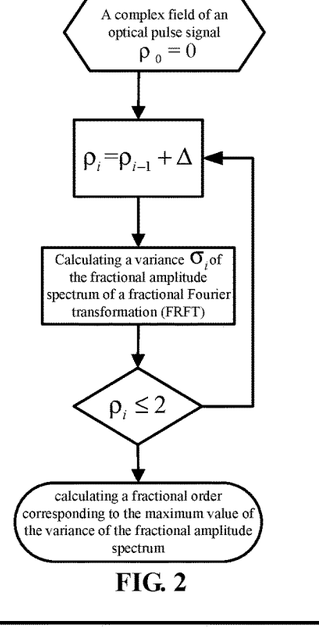
FIG. 2 is a flowchart of a method of searching for an optimal fractional order in the present invention and embodiments.

The procedure of the method of searching for an optimal fractional order of "calculating an optimal fractional order of the FRFT" in the step three and step seven (corresponding to the grey bolded box indicated by the $3^{rd}$ and $7^{th}$ arrows, respectively) is as shown in FIG. 2.

In an embodiment, a system for monitoring of the nonlinear effect of an optical fiber link by FRFT can interference-freely monitor the nonlinear effect of optical fiber links. The effect of measurement is independent of a type of an optical fiber, a modulation format and a rate of an optical fiber link signal, solves a real-time monitoring of the nonlinear effect of high-speed optical fiber link, currently.

Figure 3:
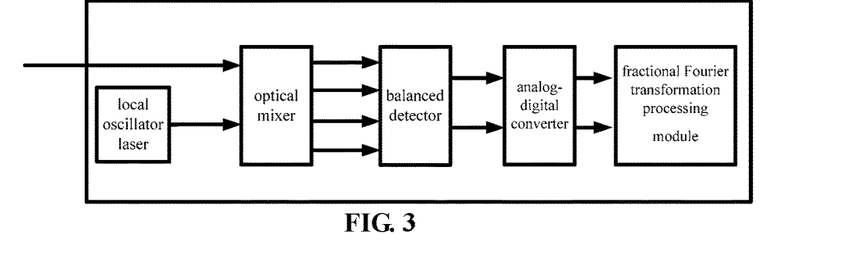
FIG. 3 is a schematic diagram of a system structure for monitoring the nonlinear effect of an optical fiber link by FRFT in the present invention and embodiments.
Figure 4:
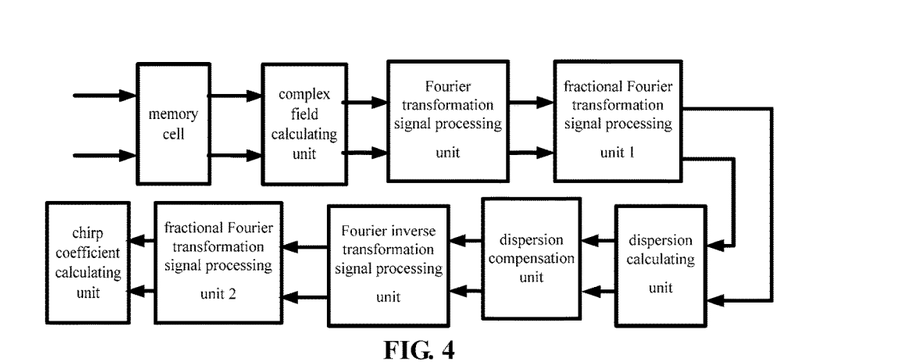
FIG. 4 is a structure diagram of FRFT processing modules in the present invention and embodiments.

The system (hereinafter referred to as "system") upon the method for monitoring of the nonlinear effect of an optical fiber link by FRFT in the present embodiment is unnecessary to change a transmitter, and has features of simple in structure, easy to implement. The system as shown in FIG. 3 is made up of a local oscillator laser, an optical mixer, a balanced detector, an analog-digital converter, a FRFT processing module, where the fractional Fourier transformation processing module as shown in FIG. 4 comprises a memory cell, a complex field calculating unit, a Fourier transformation signal processing unit, a fractional Fourier transformation signal processing unit 1, a dispersion calculating unit, a dispersion compensation unit, a Fourier inverse transform signal processing unit, a fractional Fourier transformation signal processing unit 2, and a chirp coefficient calculating unit.

A connection among each module in the system is: an output end of the local oscillator laser is connected to one input end of the optical mixer, a four-way output of the optical mixer connects the balanced detector, a two-way output of the balanced detector connects the analog-digital converter, and the two-way output of the analog-digital converter connects the fractional Fourier transformation processing module.

The operating procedure of the system is as follows:

first of all, mixing the optical pulse signals output by the optical fiber link and the output of the local oscillator laser in the optical mixer, obtaining a real part $E_I$ and an imaginary part $E_Q$ of an electric field of the optical pulse signal through the balanced detector;

secondly, after performing an analog-to-digital conversion, the real part $E_I$ and the imaginary part $E_Q$ of the electric field of the optical pulse signal enter the memory cell in the FRFT processing module for storage, and further calculating to obtain the chirp coefficient for quantitatively monitoring the nonlinear effect of the optical fiber. To be specific, the calculating procedure of the chirp coefficient is as follows:

1) the complex field of optical pulse signal obtained by a complex field calculating unit in the FRFT processing module $E=E_I+jE_Q$, where j is an imaginary unit;

2) the Fourier transformation signal processing unit performing Fourier transformation for the complex field signals E to obtain the complex field in frequency domain $\tilde{E}(\omega)$;

3) the fractional Fourier transformation signal processing unit 1 further performing a fractional Fourier transformation for the complex field in frequency domain $\tilde{E}(\omega)$ to obtain an optimal fractional order $\rho_{optimum}$, where the concrete method of obtaining $\rho_{optimum}$ is: a fractional order $\rho_i$ changes to $\rho_i=\rho_{i-1}+\Delta$ in a range of [0, 2] based on a fixed step length $\Delta$, performing FRFT for the complex field of the optical pulse signal corresponding to each fractional order to obtain a variance $\sigma_i$ of an amplitude spectrum of each FRFT, and further calculating the maximum value of all of the variances of the amplitude spectrum, and the resulting fractional order corresponding to the maximum value of the variance of the amplitude spectrum is an optimal fractional order $\rho_{optimum}$;

4) a dispersion calculating unit further calculating a chromatic dispersion of an optical fiber link, i.e., $$CD = -\frac{\cot(\frac{\pi}{2}\rho_{optimum})}{2\pi S^2},$$

where S is a scale factor in the FRFT, the value thereof is S= $\sqrt{N}$, and N is the number of samples of a signal;

5) the dispersion compensation unit performing a dispersion compensation for the complex field in frequency domain $\tilde{E}(\omega)$ to obtain the following:

$\tilde{E}_{Comp}(\omega)=\tilde{E}(\omega) \times e^{-jCD \times \omega^2}$;

6) the Fourier inverse transform signal processing unit performing an inverse Fourier transformation for the complex field in frequency domain $\tilde{E}_{Comp}(\omega)$ to obtain a complex field in time domain $E_{Comp}$;

7) the complex field in time domain $E_{Comp}$ enters the fractional Fourier transformation signal processing unit 2 once again to obtain the optimal fractional order $\rho_{optimum}$ of the FRFT;

where the method of searching for the optimal fractional order $\rho_{optimum}$ comprises a fractional-order spectral entropy, an optimal filtering operator, maximizing a density of zero-center normalized instantaneous amplitude spectrum, and maximizing a variance of fractional-order amplitude spectrum;

8) the chirp coefficient calculating unit calculating a chirp coefficient of the complex field in time domain $E_{Comp}$, i.e., $$C = -\frac{\cot(\frac{\pi}{2}\rho'_{optimum})}{2\pi S^2},$$

where S is a scale factor in the FRFT, the value thereof is S= $\sqrt{N}$, and N is the number of samples of a signal;

finally, taking an absolute value |C| with respect to above-mentioned chirp coefficient C, thus this absolute value is a numerical value of a quantitatively characterized nonlinear effect of an optical fiber.

The method and system for monitoring of the nonlinear effect of an optical fiber link by FRFT in the present embodiment are respectively as shown in FIGS. 1 and 3; and as seen from FIG. 3, the present embodiment is simple to be integrated, and satisfies the requirement of on-line, interference-free, and real-time monitoring of the optical fiber communication links; wherein the optical pulse signal output by the optical fiber links is mixed in the optical mixer with the output of the local oscillator laser, the real part and the imaginary part of an electric field of the optical pulse signal are obtained through the balanced detector, followed by an analog to digital conversion, the number of samples N of the analog to digital conversion is 8192.

Entering the FRFT processing module after the analog to digital conversion, and calculating to obtain the chirp coefficient of quantitative monitoring of the nonlinear effect of the optical fiber, the calculation procedure thereof is as shown in FIG. 4:

wherein the searching procedure of the optimal fractional order in the fractional Fourier transformation signal processing unit 2 is as shown in FIG. 2, the fractional order $\rho_i$ changes to $\rho_i=\rho_{i-1}+\Delta$ in a range of [0, 2] based on a fixed step length $\Delta$, performing FRFT for the complex field of the optical pulse signal corresponding to each fractional order to obtain the variance $\sigma_i$ of an amplitude spectrum of each FRFT, and further calculating the maximum value of all of the variances of the amplitude spectrum, and the resulting fractional order corresponding to the maximum value of the variance of the amplitude spectrum is an optimal fractional order $\rho_{optimum}$.

Figure 5:
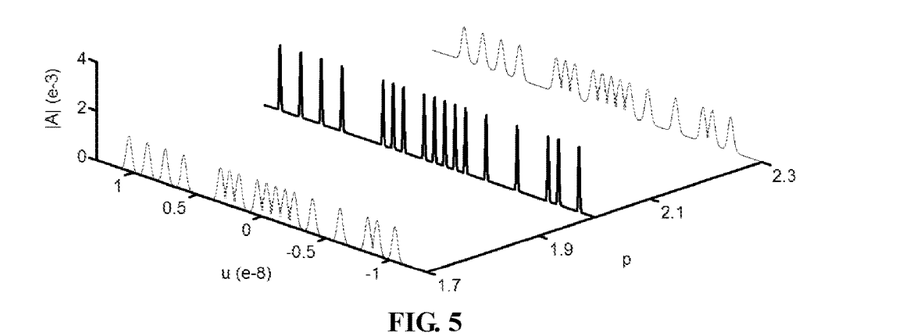
FIG. 5 is a fractional-order amplitude spectrum diagram of a 10 Gbit/s OOK optical pulses obtained by the FRFT of different orders following a dispersion compensation to the output of the optical fibers in embodiments of the present invention, wherein x-coordinates p and u are two parameters of the FRFT, respectively, and y-coordinates are an amplitude spectrum value.

FIG. 5 shows an amplitude spectrum of the fractional Fourier transformation of complex field in time domain of optical pulse sequence signal after dispersion compensations, the fractional spectrum of energy focus has the maximum variance of its amplitude spectrum, and. the corresponding fractional order is the optimal fractional order $\rho_{optimum}$. The chirp coefficient of the complex field in time domain of the optical pulse signals after a dispersion compensation calculated based on the optimal fractional order is as follows:

$$C = -\frac{\cot(\frac{\pi}{2}\rho'_{optimum})}{2\pi S^2};$$

where S is a scale factor in the FRFT, the value thereof is S= $\sqrt{N}$, and N is the number of samples of a signal i.e., 8192. The absolute value |C| of the chirp coefficient of the complex field in time domain of an optical pulse sequence signal following the dispersion compensation is proportional to the nonlinear phase shift of the quantitatively characterize nonlinear effect of the optical fibers, therefore the |C| can be used for quantitatively characterizing the nonlinear effect of the optical fibers.

Figure 6:
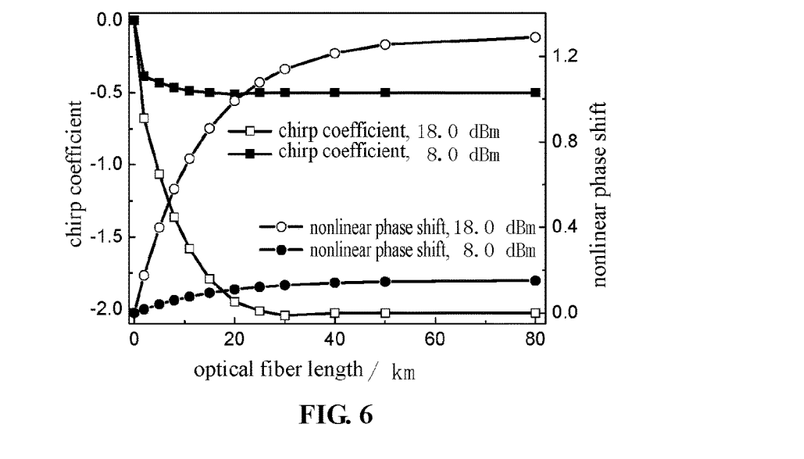
FIG. 6 is a relation curve of the chirp coefficient obtained by adopting the FRFT to its time-domain signal and the maximum nonlinear phase shift of the nominal optical fiber link following a dispersion compensation of a 10 Gbit/s OOK optical pulses output from the optical fibers of different lengths in embodiments of the present invention.

FIG. 6 is a relation of the chirp coefficient obtained from the output optical pulse sequences via the FRFT processing module and the nominal nonlinear phase shift after the optical pulse sequence signal having a pulse width of 100 picoseconds is transmitted via the standard mono-mode optical fiber of different lengths, when the peak powers of optical pulses of the present embodiment are 8.0 dBm and 18 dBm, respectively.

Figure 7:
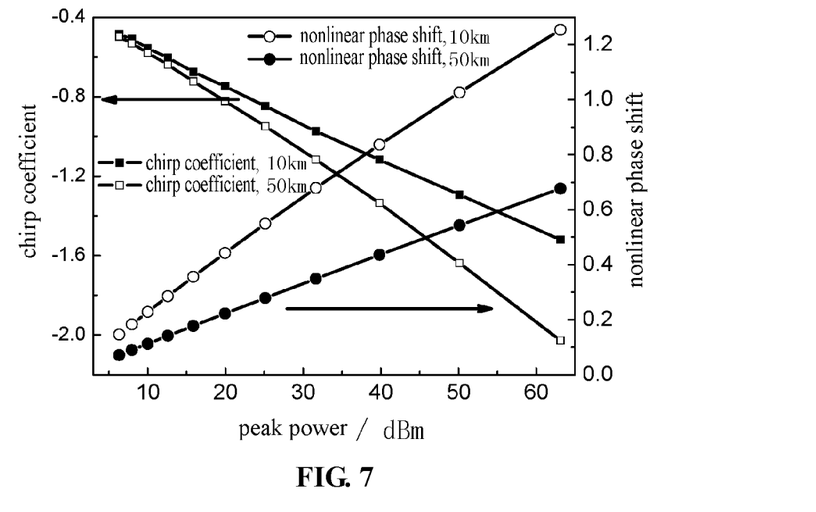
FIG. 7 is a relation curve of the chirp coefficient obtained by adopting the FRFT to its time-domain signal and the maximum nonlinear phase shift of the nominal optical fiber link following a dispersion compensation of a 20 Gbit/s QPSK, optical pulses output from a standard single mode

FIG. 7 is a relation of the chirp coefficient obtained by the FRFT processing module and the nominal nonlinear phase shift after the optical pulse sequence signals of different pulse peak value powers of the present embodiment are transmitted via the optical fibers having lengths of 10 km and 50 km, respectively. Whereby it can be seen in FIG. 7 that the system of monitoring the nonlinear effect of the optical fiber link designed based on the present invention and embodiments can quantitatively characterize the nonlinear effect of the optical fiber through the chirp coefficient and has features of monitoring conveniently, and accurately.

As can be seen from the result of FIGS. 6 and 7, the chirp coefficient obtained by the FRFT processing module can quantitatively monitor and characterize the size of the nonlinear effect of the optical fiber. Where after the optical pulse in a modulation format of OOK with 10 Gbit/s having a peak power of 18 dBm in FIG. 6 is transmitted 80 km via the monomode optical fiber, the accumulated nonlinear phase shift is 1.2 radians; the peak power of the optical pulse in a modulation format of QPSK with 20 Gbit/s in FIG. 7 varies from 0 dBm to 65 dBm, and after transmitting 50 km in an optical fiber, the nonlinear phase shift is also 1.2 radians. This indicates that the system of monitoring of the nonlinear effect of an optical fiber link involved in the present invention and embodiments has features of wide monitoring range and accurate measurement, and meanwhile further indicates that the present invention and embodiments satisfy the requirement of the nonlinear effect of high-speed optical fiber communication links and optical networks, can be applied to an optical communication link system consisting of different types of optical fibers, and different modulation modes, in particular applicable to a high-speed optical-fiber communication system for accurately monitoring and equalizing of the nonlinear effect.

"Method and system for monitoring of the nonlinear effect of an optical fiber link by FRFT" in the present invention is described in detail in the foregoing, however, embodiments of the invention are not limited thereto. The embodiments are illustrated only to assist in understanding of the method of present invention and the core concept thereof; meanwhile, for those skilled in the art, both embodiments and application ranges will be changed based on the idea of the invention, as apparent from the foregoing, this description should not be construed as limiting the invention.

A variety of obvious changes made hereto without departing from the spirit of the method of the present invention and the scopes of claims fall within the scope of the invention.

The invention claimed is:

1. A method for monitoring the nonlinear effect of an optical fiber link by fractional Fourier transformation, FRFT, comprising:
   step one, performing coherent demodulation for an optical signal propagating through an optical fiber link to obtain a real part $E_I$ and an imaginary part $E_Q$ of an electric field of the optical signal, and next, calculating the complex electric field of the optical signal by $E=E_I+jE_Q$, where j is an imaginary unit;
   step two, performing Fourier transformation for the complex field of the optical signal obtained in the step one to obtain the complex field in frequency domain;
   step three, performing FRFT for the complex field in frequency domain obtained in the step two, calculating an optimal fractional order of the FRFT;
   step four, calculating the chromatic dispersion of an optical fiber link based on the optimal fractional order obtained in the step three;
   step five, compensating for the chromatic dispersion based on the chromatic dispersion of the optical fiber link obtained in the step four to obtain a signal following the dispersion compensation;
   step six, performing an inverse Fourier transformation for the signal following the dispersion compensation obtained in the step five to obtain a complex field in time domain;
   step seven, performing FRFT for the complex field in time domain obtained in the step six, calculating the optimal fractional order of the FRFT;
   step eight, calculating the chirp coefficient of the complex field in time domain based on the optimal fractional order obtained in the step seven; and
   step nine, obtaining an absolute value of the chirp coefficient obtained in the step eight.

2. The method for monitoring the nonlinear effect of an optical fiber link by FRFT according to claim 1, wherein, a method for searching for the optimal fractional order of the FRFT in the step three and step seven includes maximizing a variance of a fractional amplitude spectrum, comprising:
   calculating the variance of fractional amplitude spectrum obtained by FRFT with different fractional order, the fractional order corresponding to the maximum value of the variance of a fractional amplitude spectrum is an optimal fractional order; to be special, a fractional order $\rho_i$ changes to $\rho_i=\rho_{i-1}+\Delta$ in a range of [0, 2] based on a fixed step length $\Delta$, performing FRFT for each fractional order, respectively, calculating a variance $\sigma_i$ of the fractional amplitude spectrum of each FRFT, further calculating the maximum value of all of the variances of the fractional amplitude spectrum, and the resulting fractional order corresponding to the maximum value of the variance of the fractional amplitude spectrum is an optimum fractional order.

3. The method for monitoring the nonlinear effect of an optical fiber link by FRFT according to claim 1, wherein, in the step five, the complex field in frequency domain obtained in the step two is multiplied by a dispersion function, $\tilde{E}_{Comp}(\omega)=\tilde{E}(\omega)\times e^{-jCD\times\omega^2}$, where $\omega$ represents a frequency.

4. The method for monitoring the nonlinear effect of an optical fiber link by FRFT according to claim 1, wherein, in the step 4, the concrete method of calculating the chromatic dispersion of an optical fiber link based on the optimal fractional order obtained in the step three is: based on the optimal fractional order $\rho_{optimum}$ obtained in the step three, calculating the chromatic dispersion of an optical fiber link, that is $$CD=-\frac{\cot(\frac{\pi}{2}\rho_{optimum})}{2\pi S^2},$$

where S is a scale factor in the FRFT, the value thereof is $S=\sqrt{N}$, and N is the number of samples of a signal.

* * * * *